July 8, 1941.  P. GANTET  2,248,227

TUNED CIRCUIT

Filed Jan. 18, 1939

Inventor,
P. Gantet
By: Glascock Downing & Seebold
Attys.

Patented July 8, 1941

2,248,227

UNITED STATES PATENT OFFICE 2,248,227

TUNED CIRCUIT

Pierre Gantet, Courbevoie, France

Application January 18, 1939, Serial No. 251,615
In France January 27, 1938

6 Claims. (Cl. 178—44)

The present invention relates to apparatus for varying the electrical characteristics of oscillating circuits.

The contact resistances encountered by high frequency currents when passing from the stationary part to the movable part of an adjustable oscillating circuit and more exactly the variations of these resistances during the adjustment (or under the effect of vibrations) are the source of very troublesome disturbances.

In a receiver such resistances modulate the amplitude of the signal received or of the local oscillation and are translated by violent "grinders" which render listening-in or signal finding very laborious.

In a wave-trap they partly mask the exact tuning, and thus limit the accuracy of the measure.

These deficiencies are particularly marked in the range of very short waves.

In the French Patent No. 821,290 dated August 7, 1936, an adjustable oscillating circuit for very short waves has been described, characterised by the absence of any contact resistance in the path of the oscillating current. The total range was passed over during a rotation of 180° of the movable part.

The present invention relates to another embodiment of an adjustable oscillating circuit for metric or decimetric waves having no variable contact resistances in the path of the oscillating current and capable of covering a wider range. This range is passed over by a longitudinal displacement of the movable part.

This oscillating circuit comprises two conducting parts or electrodes insulated from each other which have the shape of rotatable coaxial bodies one of which is axially movable relatively to the other, in order to vary the width of the annular space separating them. The outer electrode is usually stationary and the inner electrode movable, but a reverse arrangement may be adopted.

These electrodes preferably comprise concentric frustum shaped surfaces having one and the same angle of conicity.

The outer electrode is preferably closed at both its ends so as to completely surround the inner electrode.

The latter is usually composed of two co-axial parts spaced apart and rigidly connected by a stay member of reduced diameter, one of these parts being frustum-shaped and the other being either frustum-shaped with a similar or different conicity, or cylindrical. The outer electrode has a corresponding shape with the exception that it does not comprise a reduced part capable of hindering the axial displacement of the inner electrode.

The annexed drawing illustrates, diagrammatically and by way of examples only, several forms of construction of the subject-matter of the invention, seen in axial section.

Figure 1:
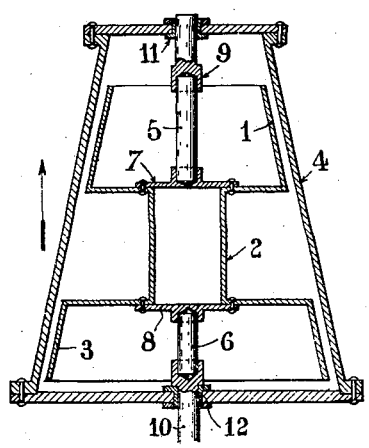
Figs. 1, 1a, 2, 3 and 4 are axial sections of five different embodiments.

The arrangement shown in Fig. 1 includes an inner movable insulated electrode or conducting part formed by two frustum-shaped caps 1 and 3 of relatively large average diameter, connected by a cylindrical rod or tube 2 of an appreciably smaller diameter.

A stationary outer electrode or conducting part 4 is provided, in the shape of a hollow truncated cone closed at both its ends, which completely surrounds the movable part and the axis of which is common to the parts 1 and 3.

Figure 1A:
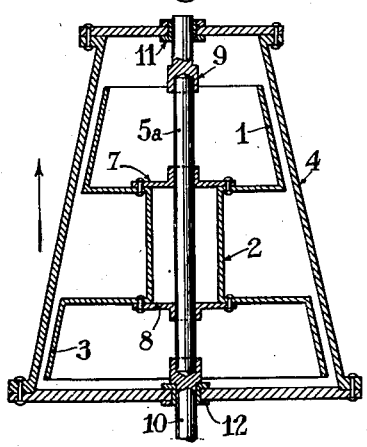

The movable part is centered in the stationary part and insulated from the latter by two insulators 5 and 6 secured to the metallic members 7 and 8 rigid with the caps 1 and 3. The other ends of the insulators are attached to cylindrical rods 9 and 10 sliding in bearings 11 and 12 secured on the cheek members of the stationary part. These two insulators 5 and 6 can be combined in a single member 5a passing through the tube 2, as indicated in Fig. 1a.

The self-inductance of the oscillating circuit thus formed is mainly constituted by the tube or rod 2. The capacity of the circuit is that of the two condensers which are respectively constituted by the caps 1 and 3 and the common casing 4 which connects them in series.

It is to be noted that the elements of this circuit present electric characteristics of self-inductance and capacity which are not strictly uniform. Furthermore, this distribution changes with the adjustment, as well as the distribution of the voltages between the two condensers. The whole nevertheless remains easily computable.

A displacement of the movable part along its axis in the direction of the arrow provides a very slight reduction of the self-inductance and an appreciable increase of the tuning capacity and the wave length peculiar to the whole increases. Reversely, it would diminish for a displacement in the reverse direction. On the contrary a rotation of the movable part has no action.

The axial displacement, which alone is necessary for the adjustment, can therefore be obtained by giving to the movable part a helical movement. For that purpose, one of the members 9 or 10 (or both) is screw threaded. The bearing 10 or 11 (or both) is replaced by a nut. The circuit is adjusted by rotating an external hand wheel keyed on 9 or 10.

For certain applications, the appreciable increase of the capacity of an element of the condenser, or the modification of its law of variation relatively to that of the other element, presents advantages.

Figure 2:
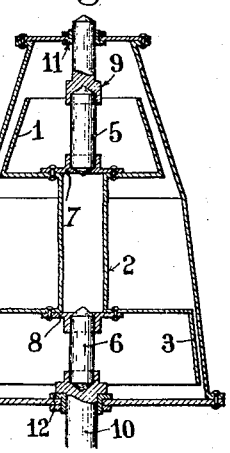

According to the invention, the frustum-shaped cap 1 will be given an angle at the apex different from that of the cap 3 and the shape of the casing 4 will be correspondingly modified, as shown in Fig. 2. For the same purposes, the arrangement described above with reference to Fig. 3 can also be adopted according to the invention.

The movable insulated conducting part is constituted by a frustum-shaped cap 1 and a cylindrical cap 3 connected by a cylindrical rod or tube 2.

The stationary metallic part 4 is of frustum-shape on that portion of its length which is opposite the frustum-shaped cap 1. The part 4 is cylindrical opposite the cylindrical cap 3. Approximately the same diameters can be given to the cylindrical parts 3 and 4 and thus the capacity between them can be increased without appreciably increasing the length.

Figure 3:
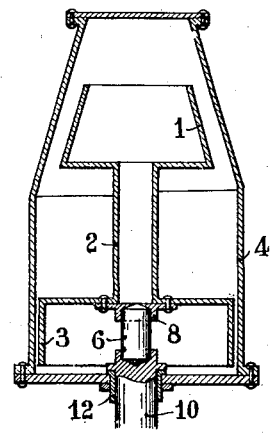

With this arrangement, the insulation can remain such as provided and described with reference to Fig. 1. If the high frequency voltage between the parts 3 and 4 is much lower than the voltage between 1 and 4, use can be made on the side 3 of a more rugged insulator. As illustrated in Fig. 3 the movable part can be mounted in an overhanging position.

Figure 4:
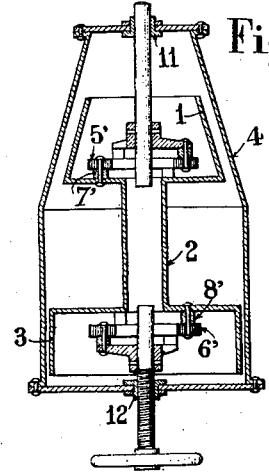
Figure 5:
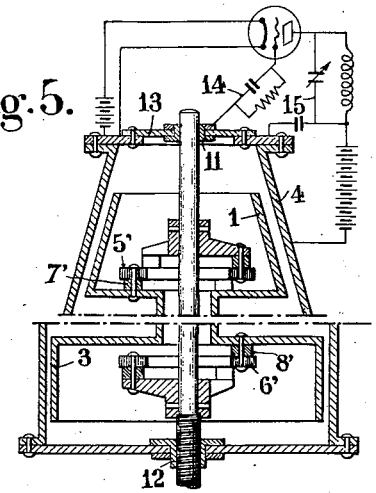
Fig. 5 shows in axial section the upper part of another embodiment as well as the diagram of an oscillating circuit, coupled with the subject-matter of the invention.
Figure 6:
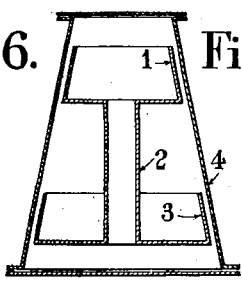
Figs. 6, 7 and 8 are diagrams of three other modifications in which the control means have not been shown.
Figure 7:
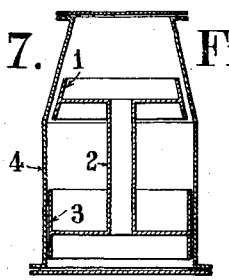
Figure 8:
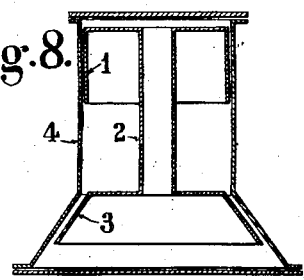

The movable part can also be insulated as illustrated in Fig. 4 wherein the insulators comprise insulating washers 5' and 6' secured at three points at 120° on bosses 7' and 8' mounted on the movable part, and at three other points offset to the extent of 60° relatively to the preceding ones on metallic star-shaped members having three branches rigid with a metal shaft passing within the tube 2. The metallic circuit constituted by the shaft and the casing being firmly coupled to the oscillating circuit must be interrupted, either by cutting the shaft as illustrated Fig. 4, or by insulating one of its ends by means of an insulator 13, as shown in Fig. 5. In this case, according to the invention, the metal shaft can be used as coupling member for coupling the oscillating circuit with an outer circuit 14, 15 connected to the insulated end of said shaft and to the casing.

These oscillating currents spread on a very small thickness of the outer surface of the movable part and of the inner surface of the stationary part. Consequently, any desirable shape can be given to the outside of the stationary part and to the inside of the movable part, and use can be made for their construction of materials which are only slightly conducting covered with a layer of good conducting material. The relative proportions different from those illustrated can be chosen and the axial length can be given any dimension considered suitable relatively to the wave length.

I claim:

1. Apparatus for varying the electrical characteristics of an oscillating circuit comprising, an electrode providing a casing and having a conical portion, an electrode arranged coaxially within the casing, said inner electrode including two electrically conductive members spaced from said casing to provide capacitative couplings between the casing and each electrically conductive member, one of said members having a conical portion arranged adjacent the conical portion of the casing, means electrically connecting said members, means insulating said inner electrode with respect to the casing and supporting the inner electrode for axial movement with respect to the other electrode.

2. Apparatus for varying the electrical characteristics of an oscillating circuit comprising, a conical shaped electrically conductive casing, two eletrically conductive members arranged within said casing, said members having conical shaped peripheral portions spaced from said casing to provide capacitative couplings between the casing and the peripheral portion of each of said members, axially arranged means of smaller diameter than said members electrically connecting the members, means supporting said members for axial movement with respect to said casing, and means insulating said members with repect to said supporting means.

3. Apparatus for varying the electrical characteristics of an oscillating circuit comprising, a conical shaped electrically conductive casing, two electrically conductive members arranged within said casing, said members having conical shaped peripheral portions spaced from said casing to provide capacitative couplings between the casing and the peripheral portion of each of said members, axially arranged means of smaller diameter than said members electrically connecting the members, means supporting said members for axial movement with respect to the casing and insulating said members with respect to the casing.

4. Apparatus for varying the electrical characteristics of an oscillating circuit comprising, a conical shaped electrically conductive casing, two electrically conductive members arranged within said casing, said members having conical shaped peripheral portions spaced from said casing to provide capacitative couplings between the casing and the peripheral portion of each of said members, axially arranged means of smaller diameter than said members electrically connecting the members, means supporting said members for axial movement with respect to said casing, means insulating said members with respect to said supporting means, and means for moving said members axially with respect to the casing.

5. Apparatus for varying the electrical characteristics of an oscillating circuit comprising, an electrically conductive casing having a cylindrical portion and a conical portion, two electrically conductive members arranged within said casing, one of said members having a conical shaped peripheral portion spaced from the conical portion of said casing to provide a capacitative coupling between the conical portion of the casing and the conical shaped periphery of said member, the other member having a cylindrical shaped peripheral portion spaced from the cylindrical portion of the casing to provide a capacitative coupling between the cylindrical portion of the casing and the cylindrical peripheral portion of said member, axially arranged means of smaller diameter than said members electrically connecting the members, and means supporting said members for axial movement with respect to the casing and insulating said members with respect to the casing.

6. Apparatus for varying the electrical characteristics of an oscillating circuit comprising, a conical shaped metal casing, two metal members arranged within the casing, said members having conical shaped peripheral portions each spaced from said casing to provide capacitative couplings between the casing and the peripheral portion of each of said members, an axially arranged tube of smaller diameter than said members electrically connecting the members, a bearing carried by the casing, a shaft mounted for axial movement in said bearing, and insulating means carried by the shaft for supporting said members.

PIERRE GANTET.